US008521025B2

(12) United States Patent
Ansari et al.

(10) Patent No.: US 8,521,025 B2
(45) Date of Patent: Aug. 27, 2013

(54) SCHEDULING WDM PON WITH TUNABLE LASERS WITH DIFFERENT TUNING TIMES

(75) Inventors: Nirwan Ansari, Montville, NJ (US); Jingjing Zhang, Keamy, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 373 days.

(21) Appl. No.: 12/996,772

(22) PCT Filed: Aug. 13, 2010

(86) PCT No.: PCT/US2010/045436
§ 371 (c)(1),
(2), (4) Date: Dec. 8, 2010

(87) PCT Pub. No.: WO2011/019992
PCT Pub. Date: Feb. 17, 2011

(65) Prior Publication Data
US 2011/0211834 A1 Sep. 1, 2011

Related U.S. Application Data

(60) Provisional application No. 61/233,539, filed on Aug. 13, 2009.

(51) Int. Cl.
*H04J 14/00* (2006.01)
(52) U.S. Cl.
USPC ............... 398/68; 398/58; 398/66; 398/70; 398/71
(58) Field of Classification Search
USPC ..................................... 398/41–79
See application file for complete search history.

(56) References Cited

U.S. PATENT DOCUMENTS

| 7,239,814 | B2 | 7/2007 | Miyasita |
| 7,496,295 | B2 * | 2/2009 | Baldine et al. ............ 398/69 |
| 7,680,416 | B2 | 3/2010 | Hann et al. |
| 7,684,705 | B2 | 3/2010 | Bouda |
| 7,684,706 | B2 | 3/2010 | Akasaka et al. |
| 7,688,870 | B2 | 3/2010 | Hwan et al. |

(Continued)

FOREIGN PATENT DOCUMENTS
WO WO 2010105548 9/2010

OTHER PUBLICATIONS

Michael P. McGarry et al. ("Just-in-Time Scheduling for Multichannel EPONS", IEEE/OSA Journal of Lightwave Technology, vol. 26, No. 10, pp. 1204-1216, 2008).*

(Continued)

*Primary Examiner* — M. R. Sedighian
(74) *Attorney, Agent, or Firm* — Turk IP Law LLC

(57) ABSTRACT

Technologies are generally described for network traffic scheduling in a wavelength division multiplexing (WDM) passive optical network (PON). Dynamic wavelength assignment and time allocation in hybrid WDM/TDM PONs with tunable lasers as optical light generators is accomplished by mapping the scheduling into a multi-processor scheduling problem with wavelength channels as machines and ONU requests as jobs. Wavelengths may be considered as parallel identical machines. Taking laser tuning time into consideration preemptive and non-preemptive scheduling with the objective of minimizing the latest job completion time is computed employing a number of heuristic algorithms. The algorithms compute two extreme cases of zero and infinity laser tuning time, respectively. Using the results from these two extreme cases, the heuristic scheduling schemes for the case of arbitrary laser tuning time yield close average latest job completion times for both schedule types.

22 Claims, 11 Drawing Sheets

(56) References Cited

U.S. PATENT DOCUMENTS

| | | | |
|---|---|---|---|
| 7,706,688 B2 | 4/2010 | Boudreault | |
| 7,715,719 B2 | 5/2010 | Bouda et al. | |
| 7,720,379 B2 | 5/2010 | Handelman | |
| 7,734,178 B2 | 6/2010 | Sakamoto et al. | |
| 7,738,167 B2 | 6/2010 | Kim et al. | |
| 7,751,712 B2 | 7/2010 | Zhao et al. | |
| 7,761,012 B2 | 7/2010 | Yu et al. | |
| 7,769,062 B2 | 8/2010 | Lu et al. | |
| 7,769,256 B2 | 8/2010 | Bai et al. | |
| 7,773,838 B2 | 8/2010 | Lee et al. | |
| 8,290,366 B2 * | 10/2012 | Lee et al. | 398/57 |
| 2002/0154357 A1 * | 10/2002 | Ozveren et al. | 359/124 |
| 2009/0154924 A1 * | 6/2009 | Liu et al. | 398/58 |
| 2010/0232790 A1 | 9/2010 | Ansari et al. | |

OTHER PUBLICATIONS

Yuang M.C. et al., "HOPSMAN: An Experimental Testbed System for a 10-Gb/s Optical Packet-Switched WDM Metro Ring Network" IEEE Communications Magazine, vol. 46, Issue 7, pp. 158-166, (Jul. 2008).

Zouganeli, E., Deliverable 2.3 , VD2 Technical Report 1, May 2005, "Metro and Access Networks: Technologies Architectures and Protocols", pp. 1-57 http://www.e-photon-one.org/ephotonone/imatges/ContentFile141.pdf.

"Transmission systems and media, digital systems and networks," ITU-T Recommendation G.984 series accessed at http://www.itu.int/rec/T-RECG/e accessed on Mar. 20, 2012, pp. 1-22.

Lee W. et al., "Bidirectional WDM-PON based on gain-saturated reflective semiconductor optical amplifiers," IEEE Photonics Technology Letters, vol. 17, Issue 11, pp. 2460-2462, ( 2005).

Modiano E. et al. "A Novel Medium Access Control Protocol for WDM-Based LAN's and Access Networks Using a Master/Slave Scheduler," Journal of Lightwave Technology, vol. 18, No. 4, IEEE, pp. 461-468 (2000).

F. Effenberger, D. Clearly, O. Haran, G. Kramer, R. D. Li, M. Oron, and T. Pfeiffer, "An introduction to PON technologies," IEEE Communications Magazine, vol. 45, No. 3, pp. S17-S25, Mar. 2007.

L. Hutcheson, "FTTx: Current status and the future," IEEE Communications Magazine, vol. 46, No. 7, pp. 90-95, Jul. 2008.

K. Grobe and J.-P. Elbers, "PON in adolescence: from TDMA to WDMPON," IEEE Communications Magazine, vol. 46, No. 1, pp. 26-34, Jan. 2008.

J. Zhang, N. Ansari, Y. Luo, F. Effenberger, and F. Ye, "Next-generation PONS: a performance investigation of candidate architectures for nextgeneration access stage 1," IEEE Communications Magazine, vol. 47, No. 8, pp. 49-57, Aug. 2009.

A. Banerjee, Y. Park, F. Clarke, H. Song, S. Yang, G. Kramer, K. Kim, and B. Mukherjee, "Wavelength-division-multiplexed passive optical network (WDM-PON) technologies for broadband access: a review," Journal of Optical Networking, vol. 4, No. 11, pp. 737-758, 2005.

J.-M. Kang and S.-K. Han, "A novel hybrid WDM/SCM-PON sharing wavelength for up- and down-link using reflective semiconductor optical amplifier," IEEE Photonics Technology Letters, vol. 18, No. 3, pp. 502-504, 1, 2006.

C.-H. Lee, S.-M. Lee, K.-M. Choi, J.-H. Moon, S.-G. Mun, K.-T. Jeong, J. H. Kim, and B Kim, "WDM-PON experiences in Korea," Journal of Optical Networking, vol. 6, No. 5, pp. 451-464, 2007.

L. Coldren, G. Fish, Y. Akulova, J. Barton, L. Johansson, and C. Coldren,"Tunable semiconductor lasers: a tutorial," IEEE/OSA Journal of Lightwave Technology, vol. 22, No. 1, pp. 193-202, Jan. 2004.

J. Buus and E. J. Murphy, "Tunable lasers in optical networks," IEEE/OSA Journal of Lightwave Technology, vol. 24, No. 1, p. 5, 2006.

Y. Luo and N. Ansari, "Bandwidth allocation for multiservice access on EPONs," IEEE Communications Magazine, vol. 43, No. 2, pp. S16-S21, Feb. 2005.

K. H. Kwong, D. Harle, and I. Andonovic, "Dynamic bandwidth allocation algorithm for differentiated services over WDM EPONs," in the Ninth International Conference on Communications Systems, Sep. 2004, pp. 116-120.

M. McGarry, M. Reisslein, and M. Maier, "WDM Ethernet passive optical networks," IEEE Communications Magazine, vol. 44, No. 2, pp. 15-22, Feb. 2006.

A. R. Dhaini, C. M. Assi, M. Maier, and A. Shami, "Dynamic wavelength and bandwidth allocation in hybrid TDM/WDM EPON networks," IEEE/OSA Journal of Lightwave Technology, vol. 25, No. 1, pp. 277-286, 2007.

M. P. McGarry, M. Reisslein, C. J. Colbourn, M. Maier, F. Aurzada, and M. Scheutzow, "Just-in-time scheduling for multichannel EPONs," IEEE/OSA Journal of Lightwave Technology, vol. 26, No. 10, pp. 1204-1216, 2008.

Jingjing Zhang and Nirwan Ansari, "Scheduling Hybrid WDM/TDM Passive Optical Networks with Non-zero Laser Tuning Time," Advanced Networking Laboratory Department of Electrical and Computer Engineering, New Jersey of Technology, pp. 1-13, Aug. 2011.

Jingjing Zhang and Nirwan Ansari, "Scheduling WDM EPON with Non-zero Laser Tuning Time" Advanced Networking Laboratory Department of Electrical and Computer Engineering, New Jersey Institute of Technology, pp. 1-10, Aug. 2011.

Kim et al., "Design and Performance Analysis of Scheduling Algorithms for WDM-PON Under SUCCESS-HPON Architecture", Journal of Lightwave Technology, vol. 23, No. 11, Nov. 2005, pp. 3716-3731 The whole document (in particular, Figure 8 & table II).

Xiao et al., "An Efficient Reservation MAC Protocol with Preallocation for High-Speed WDM Passive Optical Networks", Proceedings of IEEE Infocom 2005, Mar. 13-17, 2005, Miami, FL, USA, vol. 1, pp. 444-454 The whole document (in particular, Figures 1-2).

International Search Report & Written Opinion PCT/US10/45436, International filed Aug. 13, 2010 mailed Nov. 11, 2010.

* cited by examiner

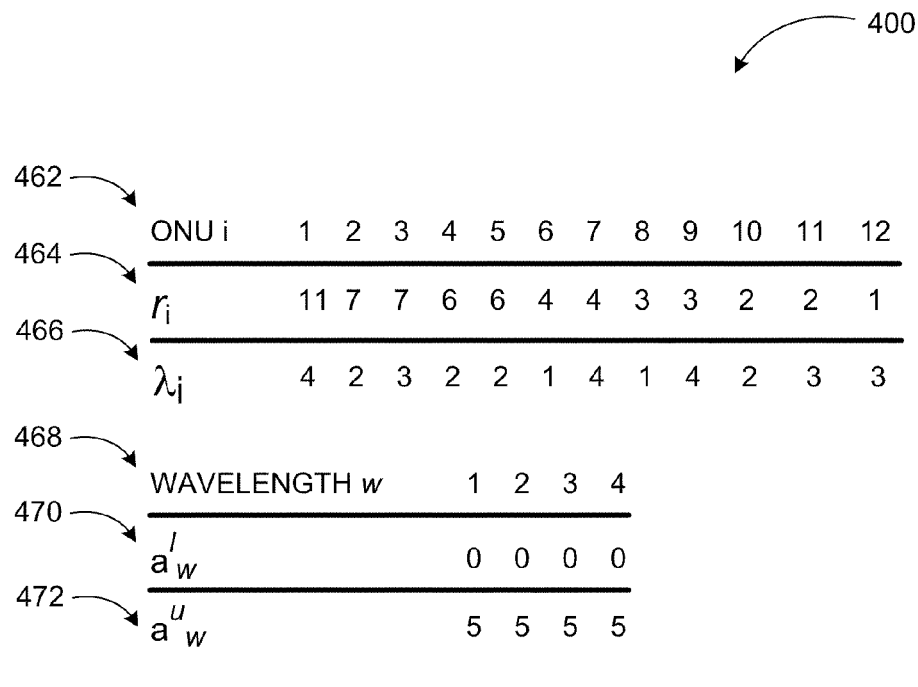
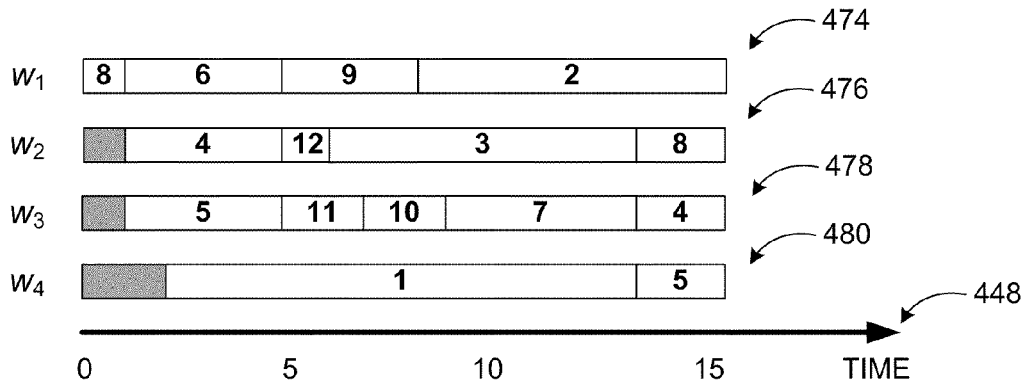
FIG. 4

SCHEDULING WDM PON WITH TUNABLE LASERS WITH DIFFERENT TUNING TIMES

CROSS REFERENCE TO RELATED APPLICATIONS

This application claims the benefit of U.S. Provisional Patent Application Ser. No. 61/233,539 filed on Aug. 13, 2009. The disclosures of the provisional patent application are hereby incorporated by reference for all purposes.

This application claims the benefit of International Patent Application Serial No. PCT/US10/45436 filed on Aug. 13, 2010. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

Wavelength Division Multiplexing (WDM) Passive Optical Network (PON) is a recently developed network technology for meeting the rapidly increasing traffic demands caused by the popularization of the Internet and spouting of bandwidth-demanding applications. The inherent high cost of multi-wavelength provision may hinder the deployment of WDM PON. As compared to Time Division Multiplexing (TDM) PON, WDM PON may be associated with additional capital expenditure in enabling remote nodes, transmitters, and receivers with multi-wavelength provision capability. The multi-wavelength provision is one parameter in determining the capacity of WDM PON architecture. Specifically, the capacity of a PON system may depend on the network architecture, wavelength supporting capability of optical devices, as well as data rate of the source generators and receivers.

Similar to multiple wavelength sources, tunable laser sources are able to generate multiple wavelengths one wavelength at a time. From a network operator's point of view, tunable lasers offer advantages such as simple inventory management, reduced sparing cost, and automated wavelength provisioning. From the MAC layer's point of view, in the case of wavelength-fixed lasers, one wavelength channel is utilized by a fixed set of lasers, and thus statistical multiplexing gain cannot be exploited for traffic from lasers using different wavelength channels. In the case of wavelength tunable lasers, the wavelength tunability of tunable lasers facilitates the statistical multiplexing of traffic from a larger set of lasers, thus potentially yielding better system performance. The present disclosure appreciates that there are several limitations with designing WDM PONs with tunable laser optical network units (ONUs). For example, laser tuning times range from a few tens of nanoseconds to seconds, or even minutes, depending on the adopted technology. Different laser tuning times may introduce different network performances. Thus, scheduling of network traffic on ONUs may become complex given different laser tuning times.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates an example of preemptive scheduling when laser tuning time has a value between zero and infinity;

DETAILED DESCRIPTION

Figure 1:
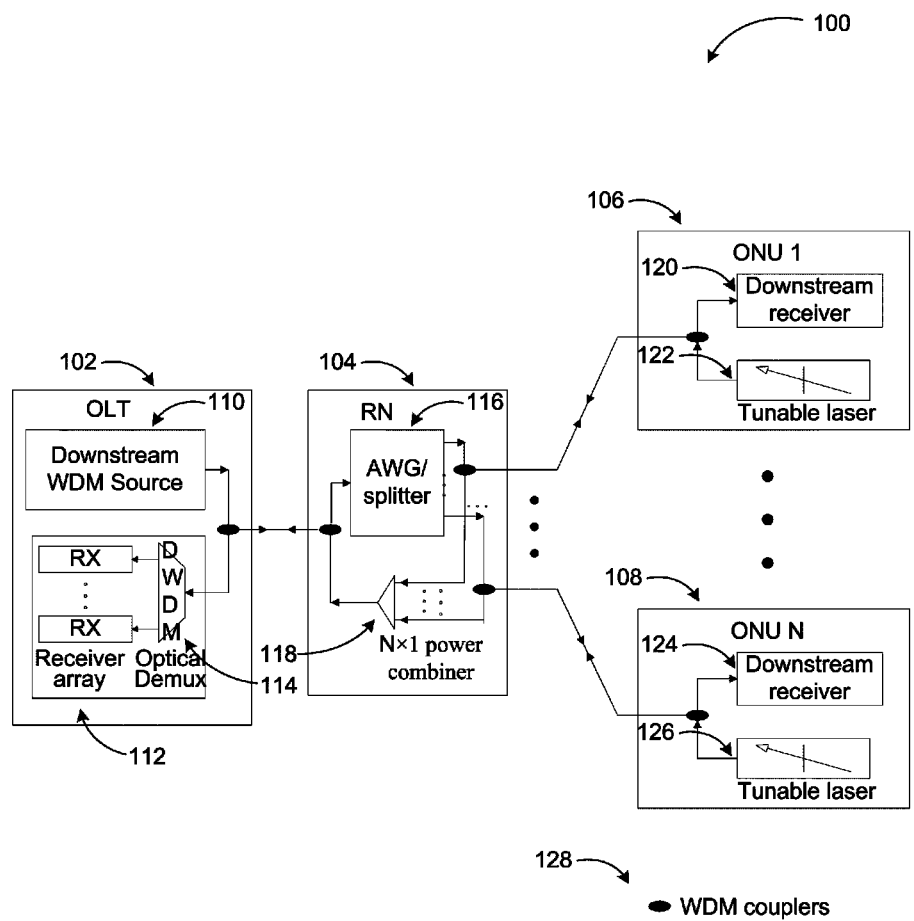
FIG. 1 illustrates an example WDM PON architecture, where laser tuning time may be taken into consideration in scheduling network traffic for ONUs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to optimized scheduling of network traffic for tunable laser ONUs in WDM PONs taking laser tuning time into consideration.

Briefly stated, dynamic bandwidth allocation (DBA) with any laser tuning time may be mapped into a multi-processor scheduling problem, with wavelength channels as machines, requests from ONUs as jobs, and the laser tuning time as the time that jobs take to switch wavelengths. The latest ONU request (job) completion time may then be minimized to achieve less delay, fairness, and load balancing in practical scenarios with non-zero laser tuning time in preemptive or non-preemptive scheduling scenarios. Some embodiments may also be implemented for any multiprocessor scheduling computation, where jobs take non-negligible time to switch machines. Such embodiments may be implemented in various fields like industrial engineering and telecommunications.

FIG. 1 illustrates an example of WDM PON architecture, where laser tuning time may be taken into consideration in scheduling network traffic for ONUs according to at least some embodiments described herein. To provision multiple wavelengths for upstream transmission, a WDM PON may be realized in two major classes of architectures, depending on the placement of optical light generators. The first class is to equip optical network units (ONUs) with lasers for their own upstream traffic transmission. The lasers may be placed at the ONU side. The second class may utilize lasers at the optical line terminal (OLT) side to supply seed light for upstream transmission. The unmodulated light supplied by OLT may be first transmitted down to ONUs and then modulated and reflected back by ONUs. Instead of lasers, reflective receivers and modulators may be equipped at ONUs to realize colorless ONUs. The reflective modulator may be based on reflective semiconductor optical amplifier (RSOA) combined with an electro-absorption modulator. Since the signal and seed lights are transmitted in opposite directions on the same wavelength, this type of network may need to consider the effect of optical reflection, including Rayleigh backscattering, which may limit maximum network reach and largest channel bit rate. A network architecture according to the first class may be simpler, more reliable, and potentially able to achieve a higher loss budget and larger bit rates.

There are three major classes of optical source generators depending on the wavelengths generation capability, namely, wavelength-specific sources, wavelength-tunable sources, and multi-wavelength sources. A wavelength-specific source may emit one specific wavelength, e.g., the common distributed feedback (DFB) laser diode (LD), distributed Bragg reflector (DBR) LD, or the vertical-cavity surface-emitting LD. A multiple-wavelength source may be able to generate multiple WDM wavelengths simultaneously, including multi-frequency laser, gain-coupled DFB LD array, or chirped-pulse WDM. Beside multi-wavelength sources, a wavelength-tunable source may generate multiple wavelengths as well. However, the wavelength-tunable source can typically generate one wavelength at a time. Tunable lasers may employ many technologies such as DFB array, sampled grating DBR, external cavity diode laser etalon, etc. Different technologies may yield different tuning ranges.

From a media access (MAC) layer's point of view, in the case of wavelength-specific lasers, one wavelength channel is utilized by a fixed set of lasers, and thus the statistical multiplexing gain cannot be exploited for traffic from lasers using different wavelength channels. In the case of wavelength-tunable lasers, the wavelength tunability may facilitate statistical multiplexing of traffic from a larger set of lasers, thus potentially enhancing system performance. Tunable lasers also provide simpler inventory management and reduced spare parts costs for network operators.

According to some implementations, one wavelength may be shared by more than one ONU (106, 108) in a time division multiplexing (TDM) fashion as shown in diagram 100. The hybrid WDM/TDM property of the upstream transmission makes it possible to exploit statistical gain among traffic from different ONUs. In the upstream transmission, tunable lasers (122, 126) at ONUs may be configured to first send out the modulated signal to a remote node (RN) 104. The RN may include a wavelength-insensitive power combiner 118 that is configured to multiplex the upstream signal from ONUs onto the fiber connected to an OLT 102. The signal, which is multiplexed in both the time and wavelength domains, may then be transmitted by the RN 104 to the OLT 102. The OLT 102 may include a wavelength demultiplexer 114 and a receiver array 112 configured to receive the upstream signal. Alternatively, the OLT 102 may also include a downstream WDM source 110 that is configured to send transmissions downstream to downstream receivers 120 and 124 through a splitter 116 at the RN 104. WDM couplers 128 provide coupling for the light transmission path between different components of the system.

Each ONU (106, 108) in diagram 100 may be equipped with a tunable laser (122, 126) that is adapted for use in upstream data transmissions. Each laser (122, 126) may be tuned to a particular set of wavelengths. The sets of wavelengths tuned by different lasers may include the same particular set of wavelengths, overlapping sets of wavelengths, or disjointed sets of wavelengths. Some particular wavelengths may be shared by more than one ONU so that the statistical gain among traffic of ONUs that share wavelengths may be exploited.

The upstream-modulated signals may first be transmitted from ONUs (106, 108) by tunable lasers to RN 104. After RN 104 receives the upstream signal, RN 104 may use WDM couplers 128 to separate the upstream signal from the downstream signal and then may employ wavelength-insensitive power combiner 118 to multiplex the upstream signal from the total of ONUs onto the fiber connected to OLT 102. The output signal of the power combiner 118 may be multiplexed in both the time and wavelength domains. RN 104 may then transmit the multiplexed signal to OLT 102. OLT 102 may employ wavelength demultiplexer 114 and a receiver array 112 to receive the upstream signal. In some examples, both the number of output ports of the demultiplexer 114 and the number of receivers may be equal to the total number of wavelengths used in the network. As shown in diagram 100, an example upstream transmission link may consist of four WDM couplers 128, a power combiner 118, a dense WDM demultiplexer 114, and optical fibers. The ONUs, OLTs, RN, and WDM couplers may be considered nodes of the network.

WDM PONs offer high bandwidth provision by exploiting the high bandwidth of optical fibers. In addition to the above described example network architecture, other approaches are also used to tackle the multi-wavelength provisioning. In some example systems, each ONU may be equipped with lasers for its own upstream traffic transmission. Lasers equipped at ONUs may generate multiple wavelengths at a time. Other example systems may utilize lasers at the OLT side to supply light sources for upstream data transmission at ONUs. The unmodulated signal supplied at the OLT is first transmitted down to ONUs, and then modulated and reflected back by ONUs. Instead of lasers, reflective receivers and modulators may be used at ONUs. The reflective modulator may be based on RSOA combined with an electroabsorption modulator (EAM). The scheme of placing lasers at the OLT enables the sharing of cost-intensive upstream source generators. A wavelength-specified source emits only one specific wavelength, e.g., the common DFB. These wavelength-specified lasers have to be specified at different wavelengths for multi-wavelength provisioning. Similar to multiple wavelength sources, a tunable source is able to generate multiple wavelengths, but only generate one wavelength at a time.

Tunable transceivers may be based on various technologies such as mechanical, acousto-optic or electro-optic tunability. As an emerging technology, the important cost elements of tunable lasers include "non-optical" specifications such as package dimension, output power, power variation over wavelength, electrical power dissipation, and optical specifications, which include the tuning speed and tuning range.

Lasers' tuning (wavelength switching) time impact the scheduling schemes, and hence system performance. According to the adopted technology, the tuning time may range from a few tens of nanoseconds (electrooptic) to a few tens of milliseconds (mechanical), or even seconds or minutes. Generally, the higher the tuning speed, the more sophisticated the technology is needed, and hence the higher the tunable laser costs. Assuming a DBA cycle lasts for 2 ms, the tuning time with some of the technologies are not negligible as compared to one DBA cycle from the perspective of the MAC layer scheduling. Embodiments take into consideration laser tuning time in designing scheduling schemes.

Figure 2:
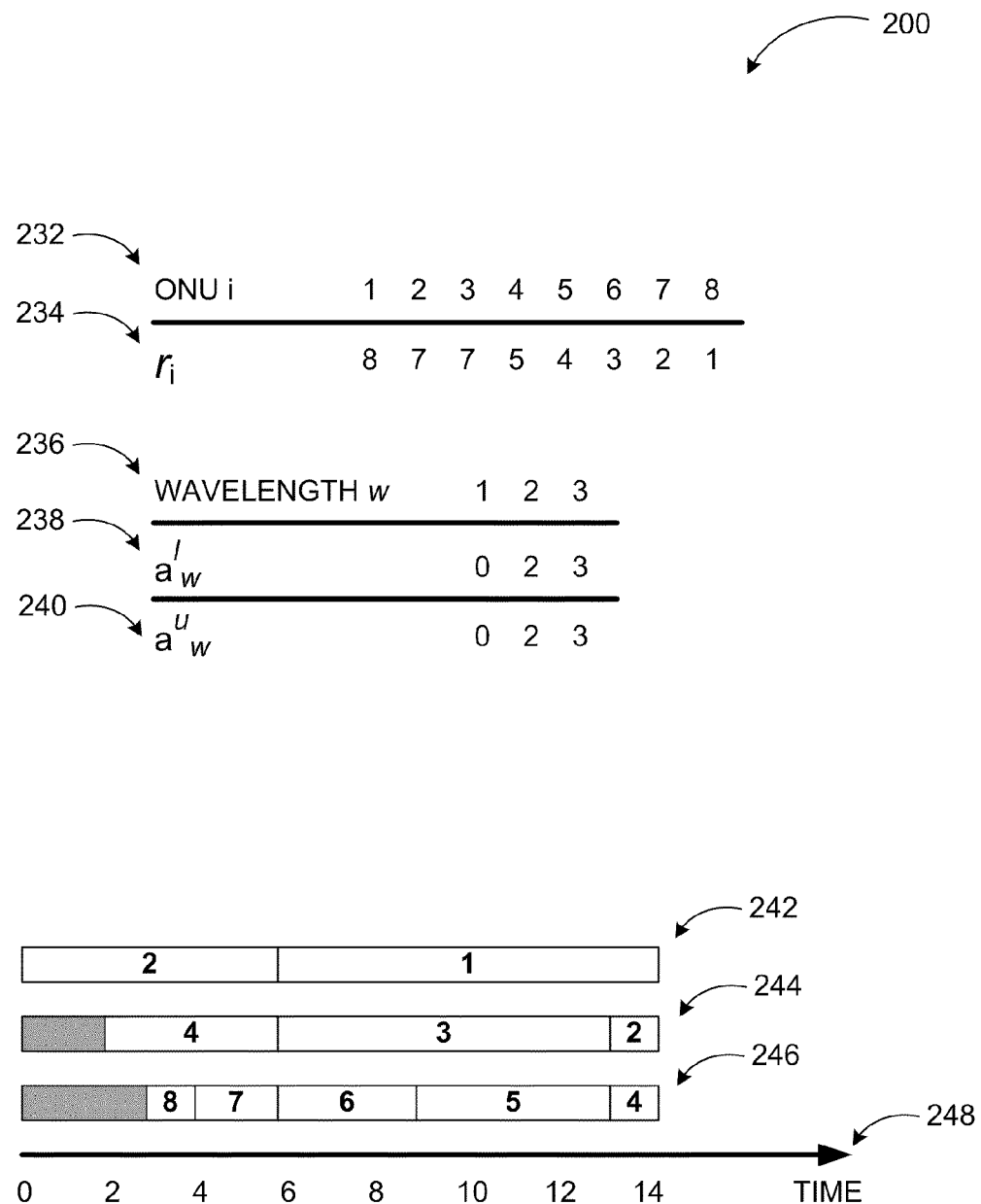
FIG. 2 illustrates an example of preemptive scheduling when laser tuning time has a value of zero.

FIG. 2 illustrates an example of preemptive scheduling when laser tuning time has a value of zero. Network traffic scheduling for a WDM PON with tunable laser ONUs can be mapped into a multi-processor scheduling problem by regarding wavelength channels as parallel independent machines and queue requests from ONUs as jobs. Both machines and jobs in the multi-processor scheduling problem may possess some unique properties. For jobs, requests from queues in the same ONU may be treated as one single job. Then, the jobs can be viewed as possessing two main properties: (1) due to the lasers' tuning time, a certain time gap may be needed between the scheduling time of two jobs belonging to the same ONU when they use different wavelength channels; (2) a job may be divided into a group of subjobs each corresponding to a request from one queue in an ONU. These decomposed subjobs may be further divided into subjobs each corresponding to requests of particular packets in the queue. Thus, the jobs can be preemptable. However, since fragmentation is not allowed in a PON, a packet cannot be further decomposed into subpackets. Therefore, jobs cannot be decomposed infinitely. Thus, some subjobs are non-preemptable. For machines, each machine (wavelength channel) may have its own dynamic resource allocation (DBA) cycle. Assuming extended multipoint control protocol (MPCP) is used by the WDM PON, the duration of the DBA cycle with respect to each wavelength in WDM PON may be dynamically adaptive to the incoming traffic. The cycle length may have an upper bound to avoid significant delay to satisfy the quality of service (QoS) requirements of some queues. Furthermore, since the traffic conditions on different wavelengths may be different from each other, the cycle lengths of wavelengths may differ from each other. Thus, equalizing DBA cycle durations for all wavelengths may be treated as scheduling objective.

According to some embodiments, network traffic scheduling in a WDM PON with tunable lasers may be mapped into a multi-processor scheduling problem, in which jobs can be either preemptable or non-preemptable. The lasers' tuning times may be classified into three classes: (1) negligible as compared to the cycle duration, (2) non-negligible but less than one cycle duration, and (3) greater than one cycle. For lasers of category 1, existing algorithms in multi-processor scheduling may be employed to solve the problem. For lasers of category 3, scheduling may be reduced to a single-processor problem since lasers cannot switch between wavelengths within a cycle. Embodiments are directed to scheduling network traffic for lasers of category 2 employing heuristic algorithms with preemptable jobs and non-preemptable jobs.

One approach to modeling jobs is to treat each queue request of an ONU as an individual job. Due to the laser on/off time, a guard time is needed between scheduling of jobs from different ONUs. To save the guard time, jobs from the same ONU may be scheduled consecutively and can be grouped together as a single job for simplicity. Thus, the total requests of an ONU as a single job.

In multi-processor scheduling, preemptable jobs can be scheduled more flexibly and yield better system performances as compared to non-preemptable jobs. However, when preemption is allowed, jobs may be divided and scheduled in non-continuous time periods, which may incur some extra time gap for laser on/off. It is challenging to determine whether the extra cost introduced by the guard time outweighs the extra performance improvement introduced by flexibility. Some embodiments assume zero guard time for laser on/off and compare the performances of preemptive and non-preemptive scheduling.

In assigning wavelengths to ONUs, a latest job completion time among all requests may be attempted to be minimized and the usage of all wavelength channels equalized for two main reasons. First, assuming one wavelength is more loaded than another one, ONUs assigned with the over-loaded wavelength may experience longer waiting time than those using the other wavelength. Equalizing the wavelength usage may ensure fairness among ONUs. Second, in terms of the just-in-time scheduling framework, an OLT makes bandwidth allocation decisions before any of the wavelengths becomes idle. If all wavelengths become idle simultaneously, the scheduler can collect the requests from most of the ONUs, and thereby make a fair decision. If one wavelength turns idle much earlier than the others, few requests may arrive at the scheduler before the decision making time. In the worst case scenario, just-in-time scheduling may be degraded into on-line scheduling, where the decision is made for one ONU request only. This may result in unfairness and increase the frequency of calculating bandwidth allocation. Therefore, for the sake of less delay, fairness, and load balancing, minimizing the latest job completion time may be considered as the scheduling objective.

The scheduling may be mathematically formulated employing a DBA cycle. A DBA cycle in a hybrid WDM/TDM PON refers to the time difference between two consecutive DBA decision making instances. For stating DBA cycle, following definitions may be used:

n: the number of ONUs.
m: the number of wavelengths.
$\tau$: the laser tuning time.
t: the decision making time of the current cycle.
$r=\{r_1, r_2, \ldots, r_n\}$: the time durations of requests from n ONUs on m identical machines.
$\{\lambda_1, \lambda_2, \lambda_n\}$: the wavelengths lasers at n ONUs are respectively tuned at time t.
$\{C_1^{-1}, C_2^{-1}, \ldots, C_n^{-1}\}$: the latest job completion time on m wavelengths in the last cycle.

The objective can be defined as finding a schedule such that the latest job completion time on all wavelengths in the sought schedule is equal or less than the latest job completion time on all wavelengths in a particular schedule with preemption allowed and disallowed, respectively.

It can be shown that for any given request, lasers with smaller tuning time yield smaller latest job completion time. From that upper and lower bounds ($\tau=0$ and $\tau=+\infty$) may be inferred for the latest job completion time on all wavelengths in the sought schedule. For $\tau=+\infty$, a request i can only be scheduled on wavelength $\lambda_i$ and the latest job completion time on wavelength w may be defined as $a^l_w + \Sigma_{\{i|\lambda_i=w\}} r_i$, where $a^l$ is the latest job completion time for request i with $\lambda_i=w$ and $a^u$ is the latest job completion time for request i with $\lambda_i \neq w$. Thus, $a^l \leq a^u \leq a^l + \tau$, and the latest job completion time for the last cycle is $a^l_w$ if $\lambda_i = w$ and $a^u_w$ otherwise.

For $\tau=0$, the schedule may be determined through multi-processor scheduling problem. According to some embodiments, an algorithm such as algorithm 1 below may be employed.

```
1: w = 1
2:     for i = 1 : n do
3:         if the available resource on wavelength w is enough to
           schedule request i then
4:             Allocate the available time on wavelength w to request
               i from the back
5:             Update the available resource on wavelength w
6:         else
7:             Allocate the remaining time on wavelength w to
               request i
8:             Assign the remainder of request i to wavelength
               w+1
9:             w = w + 1
10:        end if
11: end for
```

Algorithm 1 assigns wavelengths to requests one by one without any ordering. If the remaining time on a wavelength is not enough to satisfy a request, the unscheduled part may be moved to the next wavelength as described in lines 7 and 8.

When $a^l_w \ne a^l_{w'}$, for all $w \ne w'$, large requests may need to be scheduled in wavelengths with smaller available time. To approach the scheduling under this condition algorithm 1 may be modified by adding an ordering process as detailed in algorithm 2 below.

1: Index ONU requests such that $r1 \le r2 \le \ldots \le rn$
2: Index wavelengths such that $a^l_1 \le a^l_2 \le \ldots \le a^l_m$
3: Perform algorithm 1

Compared to algorithm 1, algorithm 2 adds two sorting processes: sort requests in the descending order of their sizes, and sort wavelengths in the ascending order of their available time.

Diagram 200 of FIG. 2 includes a scheduling example with eight ONUs (232) and three wavelengths 236 following algorithm 2. The laser tuning times $\tau_i$ (234) for the ONUs (232) are ordered with the largest one first. Latest job completion times $a^l_w$ 238 and $a^u_w$ 240 are also listed under the wavelengths 236. The allocation of requests on wavelength $w_1$ 242 shows how request 1 is allocated with the time duration [6,14] on that wavelength. The remaining time duration on wavelength $w_1$ is not enough to satisfy request 2. Part of request 2 may be scheduled in time duration [0,6] on wavelength $w_1$ and the other part in time duration [13,14] on wavelength $w_2$ as shown by allocation of requests for wavelength $w_2$ 244. Similarly, part of request 4 may be scheduled on wavelength $w_2$, and the other part on wavelength $w_3$ as shown by allocation of requests for wavelength $w_3$ 246. The allocations of requests are illustrated on time axis 248. The requests are scheduled before time point 14.

Figure 3:
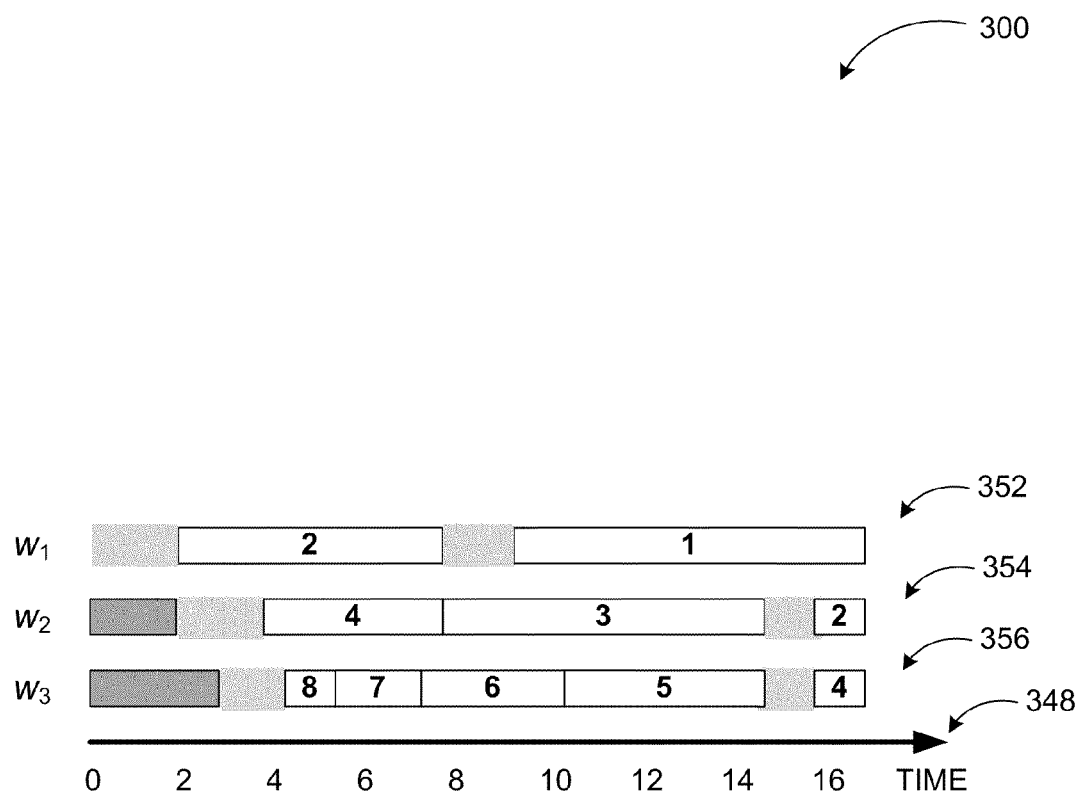
FIG. 3 illustrates an example of preemptive scheduling when laser tuning time has a value of 1.5.

FIG. 3 illustrates an example of preemptive scheduling when laser tuning time has a value of 1.5. A schedule produced by algorithm 2 for the case that $\tau=0$ may not be a feasible schedule when the laser tuning time $\tau$ is greater than zero since lasers may not be given enough time to switch wavelengths. To generate a feasible schedule for the case that $0<\tau<+\infty$, a heuristic algorithm may be employed to modify Algorithm 2.

Since all requests are postponed by time $\tau$, the corresponding laser for request i is idle during $a^l_w+\tau$, and the laser is given enough time to schedule the first request. A request may be divided into at most two parts through algorithm 2, among which one is scheduled at the end of a wavelength, and another one is scheduled at the beginning of a wavelength. Algorithm 3 postpones the last schedule on each wavelength by $\tau$, and hence lasers are given enough time to schedule the last scheduled request.

1: Construct schedule S by using algorithm 2
2: Postpone the scheduling of all requests by $\tau$
3: Postpone the scheduling of the last request on each wavelength by $\tau$ The modification, as described in algorithm 3, includes two steps. The first step is to postpone the scheduling of all requests by $\tau$ as described in line 2. The second step is to postpone the scheduling of the last request on each wavelength by $\tau$ as described in line 3.

As shown in diagram 300 for the case $\tau=1.5$, requests 1 through 8 are separated by the two postponements for each wavelength in allocations of requests for wavelengths $w_1$, $w_2$, and $w_3$ (352, 354, 356) against time axis 348. As a result, the latest job completion time increases from 14 to 17 (or by $2\tau$).

FIG. 4 illustrates an example of preemptive scheduling when laser tuning time has a value between zero and infinity. When the laser tuning time is $0<T<+\infty$, lasers need to be given at least $\tau$ time duration in order to switch wavelengths. In a preemptive downstream traffic scheduling computation, any request can be scheduled on any wavelength, but cannot be divided into parts and scheduled on multiple wavelengths. The time duration, which can be allocated on any wavelength equals to $(l-t-\tau)$. Whether all requests can be scheduled before l is equivalent to the consideration whether all these given requests can be divided into m groups, in which the sum of requests in each group is no greater than $l-t-\tau$.

In the schedule produced by algorithm 3, there are two idle time gaps of duration $\tau$ on each wavelength. One is the time gap between $a^l_w$ and $a^l_w+\tau$, and the other is the time gap before the scheduling of the last request. To produce a schedule S with latest job completion time for all wavelengths $(r, \tau)$ smaller than latest job completion time for all wavelengths $(r, 0)+2\tau$, these idle time gaps need to be properly filled. To this end, another heuristic algorithm 4 may be employed.

```
1:  Initialize x_w = γ_w, y_w = ℓ
2:  Index wavelengths such that a^l_1 ≤ a^l_2 ≤ ... ≤ a^l_m
3:  for w = 1 : m do
4:      /*Step 1: The allocation between a^u_w and ℓ*/
5:      Index unscheduled requests such that r_1 ≥ r_2 ≥ ...
6:      for i = 1 : n do
7:          if r_i ≤ y_w - a^u_w and x_w - r_i ≥ (a^u_{λ,i} - a^l_{λ,i}) then
8:              Allocate time duration [y_w - r_i, y_w] to request i
9:              y_w = y_w - r_i, x_{λ,i} = x_{λ,i} - r_i
10:         end if
11:     end for
12:     Denote x_w and y_w as x*_w and y*_w, respectively.
13:     /*Step 2: The allocation between a^u_w and y*_w /
14:     Index unscheduled requests with λ_i = w such that r_1 ≥ r_2 ≥ ...
15:     i = 1
16:     while there is available time on wavelength w and there are
        unscheduled requests with λ_i = w do
17:         if r_i ≤ y_w - a^l_w then
18:             Allocate time [y_w - r_i, y_w] on wavelength w to request i
19:         else
20:             Allocate time [a^l_w, y_w] on wavelength w and time
                [ℓ - (r_i - y_w + a^l_w), ℓ] on wavelength w + 1 to request i
21:             y_w + 1 = ℓ - (r_i - y_w + a^l_w)
22:         end if
23:         i = i + 1
24:     end while
25: end for
```

Algorithm 4 constructs the schedule according to three basic rules: (1) The time gap between $a^l_w$ and $a^u_w$ may be filled by requests with $λ_i=w$ to the best. Request i may be scheduled on a wavelength other than $\lambda_i$ only if the gap filling between $a^l_{\lambda,i}$ and $a^u_{\lambda,i}$ is not affected after the scheduling. (2) Similar to algorithm 2, to guarantee large requests with enough bandwidth, the resource in the wavelength with the smallest $a^l_w$ may be allocated first and the largest request scheduled first. (3) Similar to algorithm 3, preemption may be disallowed in the middle of the time span on a wavelength. If one request is preempted and scheduled during [μ, ν] on a wavelength, this request cannot be scheduled during μ−τ and ν+τ on any wavelength, and thus resulting in smaller chances of scheduling the remainder of the request in other wavelengths.

More specifically, algorithm 4 divides the resource allocation process on a wavelength into two steps. The first step is to allocate the time duration between $a^u_w$ and last job completion time l. The second step is to allocate the time duration between $a^l_w$ and $a^u_w$. The time duration between $a^u_w$ and last job completion time l on wavelength w may be allocated to any request, while the time duration between $a^l_w$ and $a^u_w$ on wavelength w can only be allocated to requests with $\lambda_i \neq w$. When allocating the resource between $a^u_w$ and last job completion time l, the largest request may be considered first. To avoid preemption in the middle of the schedule, a request may be scheduled on wavelength w only if the remaining available time duration after $a^u_w$ is sufficient to accommodate the request. On the other hand, since allocating request i to wavelength w may decrease the total traffic $\gamma_{\lambda,i}$ which can be used to fill the gap between $a^l_{\lambda,i}$ and $a^u_{\lambda,i}$ on wavelength $\lambda_i$, request i may be allocated onto wavelength w only if the gap filling between $a^l_{\lambda,i}$ and $a^u_{\lambda,i}$ is not affected as described in line 7.

$x_w$ may be used to track the total traffic which can fill the gap between $a^l_w$ and $a^u_w$, and $y_w$ to track the end of the available time on wavelength w. $x_w$ and $y_w$ are initialized to be $y_w$ and l, respectively. The time duration $a^l_w$ and $y_w$ is the resource, which is still available. $x_w$ and $y_w$ may be denoted after performing the first step as $x^*_w$ and $y^*_w$, respectively. The first step tries to let $y^*_w$ approach $a^u_w$ without affecting the filling of the gap between $a^l_w$ and $a^u_w$, for all w. The second step of allocating the time between $a^l_w$ and $y^*_w$ considers the largest unscheduled request with $\lambda_i = w$ first. If the remaining time is not enough to schedule the request, the remaining unscheduled part of the request may be scheduled onto the next wavelength as described in line 20.

It can be seen that if $x^*_w \geq y^*_w - a^l_w$, the time duration between $a^l_w$ and $y^*_w$ on wavelength w can be allocated, and there is no idle time gap on wavelength w. If $x^*_w < y^*_w - a^l_w$, the time duration between $a^l_w$ and $y^*_w - x^*_w$ on wavelength w is idle. Algorithm 4 takes two measures to reduce the duration of the idle time gap. One is to let $y^*_w$ approach $a^u_w$ to the best, and the other is to make sure that $x^*_w$ is always above $a^u_w - a^l_w$ if $\gamma_w \geq a^u_w - a^l_w$.

Diagram 400 illustrates an example scenario with twelve ONUs (462) and four wavelengths (468). Requests 464 are ordered based on size (large to small) along with assigned wavelengths 466. The laser tuning time for the example scenario is τ=5 for all lasers. The decision making time is t=0. The latest job completion times on wavelengths in the last cycle are 0, 1, 1, and 2, respectively (dark shaded areas in wavelength allocations 474, 476, 478, and 480). Thus, $a^l_w$ (470)={0, 1, 1, 2}, $a^u_w$ (472)={5, 5, 5, 5}, and l=15. Request 1 with the largest size cannot be scheduled on wavelength $w_1$ because the bandwidth from $a^u_1$ to l is not sufficient to satisfy request 1. Request 2 satisfies all conditions and is scheduled on wavelength $w_1$. After scheduling request 2, the remaining time duration between $a^u_1$ and l can only accommodate requests with sizes no greater than 3. Request 8 with size 3 is not scheduled between $a^u_1$ and l on wavelength $w_i$ because the gap between $a^l_1$ and $a^u_1$ cannot be filled without request 8.

After scheduling request 9, the time between $a^u_1$ and l on wavelength $w_1$ has been all allocated. The scheduling enters into the second step of allocating [$a^l_1$, $a^u_1$]. After scheduling request 6, which is the largest among all requests with $\lambda_i=1$, the remaining time duration is not enough to schedule the next largest request, i.e. request 8 with 3. Hence, request 8 is divided into two parts, among which the first part of size 1 is scheduled on wavelength $w_1$ and the second part of size 2 is scheduled on wavelength $w_2$. After repeating this process for all requests, they can be scheduled before l=15.

Figure 5:
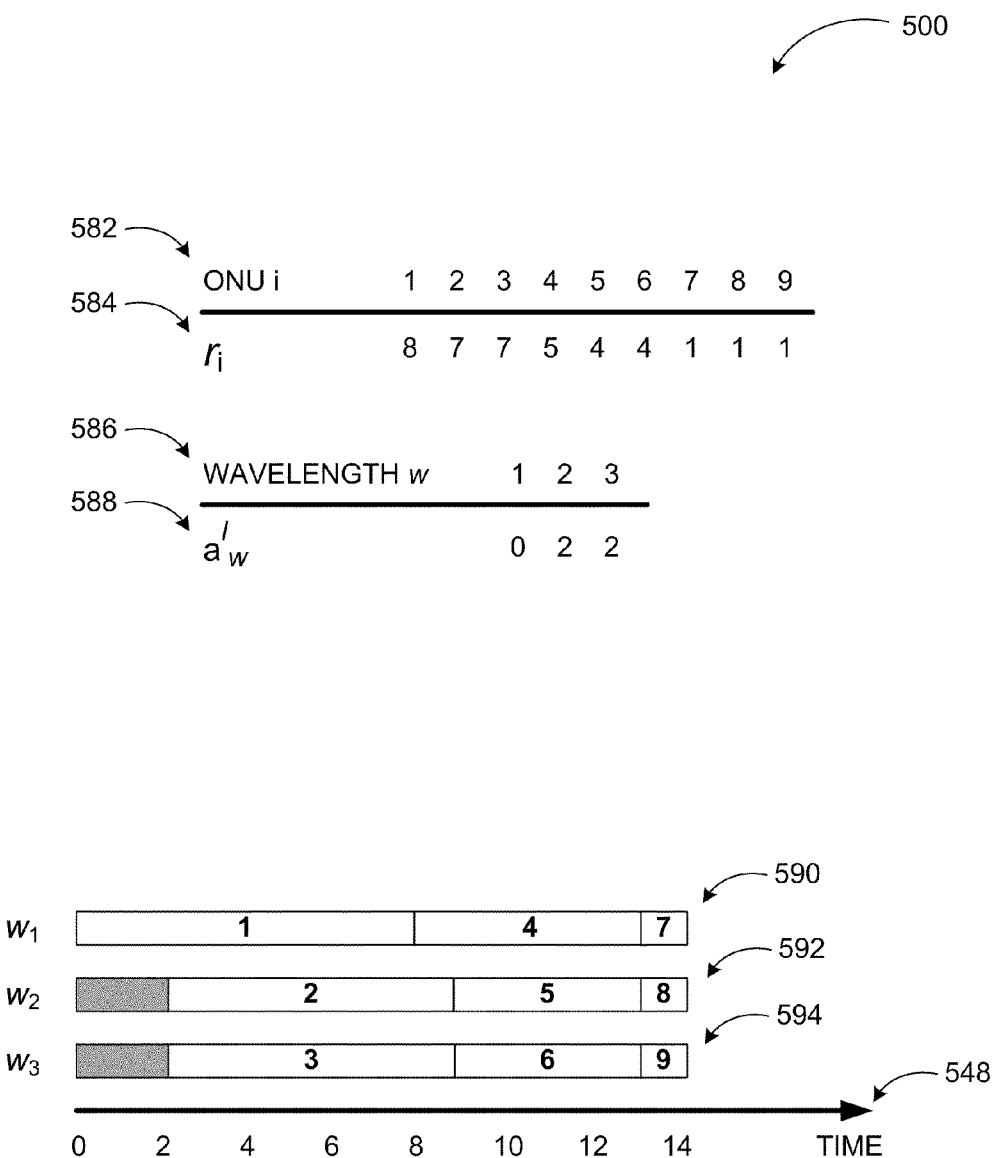
FIG. 5 illustrates an example of non-preemptive scheduling when laser tuning time has a value of zero.

FIG. 5 illustrates an example of non-preemptive scheduling when laser tuning time has a value of zero. When preemption is disallowed (non-preemptable case), the relationship between the latest job completion time and the laser tuning time still holds, i.e. for any request a latest job completion time for (r, τ) is equal or smaller than a latest job completion time for (r, τ+ϵ), where ϵ is greater than zero.

As discussed previously, lasers always stay on their respective original wavelengths when τ=+∞. Thus, preemptive and non-preemptive scheduling produces the same latest job completion time. In case of τ=0 for non-preemptive scheduling, a heuristic first-fit decreasing (FFD) algorithm (or similar) may be used.

```
 1:  Index requests such that r₁ ≧ r₂ ≧ ... ≧ rₙ
 2:  Index wavelengths such that a^l₁ ≦ a^l₂ ≦ ... ≦ a^l_m
 3:  for i = 1 : n do
 4:      w = 1
 5:      while Request i is not scheduled yet do
 6:          if wavelength w has enough bandwidth for the request then
 7:              Assign wavelength w to the request
 8:          else
 9:              w = w + 1
10:          end if
11:      end while
12:  end for
```

Algorithm 5 above is an example of an FFD algorithm and first sorts jobs in the descending order of their sizes and machines in the descending order of their channel available time. Then, the algorithm searches from the first machine and tries to assign a job with the first machine on which the job fits. If all the jobs can be scheduled before l, then l is a feasible solution.

Diagram 500 illustrates an example scenario with nine ONUs 582 and three wavelengths 586, where the requests 584 are scheduled according to non-preemptive scheduling. The requests 584 are again ordered by size (large to small) and $a^l_w$ 588 are listed for each wavelength. As shown in wavelength allocations 590, 592, and 594 against time axis 548, the requests are allocated on wavelengths $w_1$, $w_2$, and $w_3$ without splitting a request between two wavelengths following algorithm 5.

Figure 6:
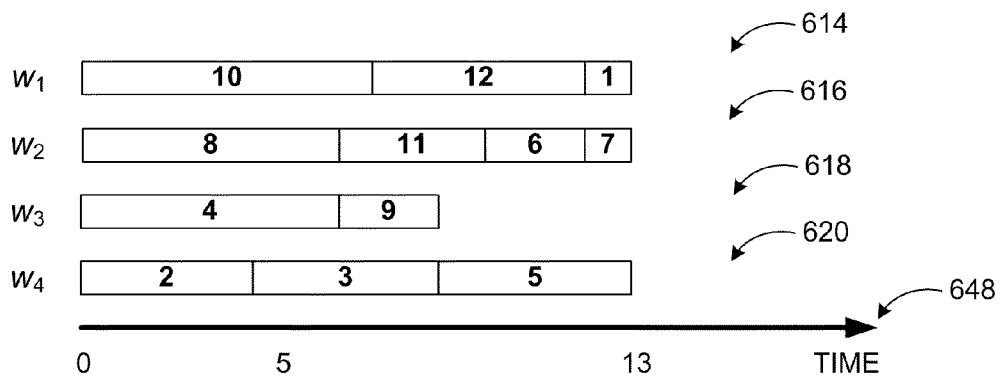
FIG. 6 illustrates an example of non-preemptive scheduling when laser tuning time has a value between zero and infinity.

FIG. 6 illustrates an example of non-preemptive scheduling when laser tuning time has a value between zero and infinity. In the general case of 0<τ=∞, scheduling is NP-hard when preemption is disallowed, since it is not easier than the computation under the case that τ=0. Two heuristic algorithms may be employed for this particular scheduling by modifying algorithm 5 in different ways. Algorithm 6 below describes a first heuristic algorithm that may be employed. In algorithm 6, schedule S is first constructed by using algorithm 5. Then, the scheduling of all requests is postponed by time τ to give lasers enough time to switch wavelengths. Since preemption is disallowed in schedule S, each request is scheduled on one wavelength only in schedule S. By postponing all requests in S with τ=0 with a time duration of τ, the time period between $a^l_w$ and $a^l_w+\tau$ is idle, and hence lasers can have enough time to switch wavelengths.

1: Construct schedule S by using algorithm 5
2: Postpone scheduling of all requests in S by time τ

In the schedule produced by algorithm 6, the time duration between $a^l_w$ and $a^l_w+\tau$ is unoccupied. To generate a schedule with a smaller latest job completion time, algorithm 7 below may be employed by filling idle time durations on all wavelengths. Algorithm 7 includes two steps. The first step is to allocate the time period between $a^l_w$ and $a^u_w$ on wavelength w to requests with $\lambda_i$=w. The largest jobs may be given higher priorities since they are not easy to switch wavelengths. The second step is to allocate the time period between $a^l_u$ and l. According to some embodiments, algorithm 5 may be applied directly in the second step.

---
1: /*Step 1: Schedule between $a^u_w$ and $\ell$*/
2: for w = 1 : m do
3:   Index requests with $\lambda_i$ = w such that $r_1 \geq r_2 \geq r_3$....
4:   Allocate time to requests with $\lambda_i$ = w until the time exceeds $a^u_w$
5: end for
6: /*Step 2: Schedule between $a^l_w$, and $a^u_w$*/
7: Run algorithm 5 to allocate bandwidth to remaining unscheduled requests
---

Diagram 600 illustrates the same example scenario as shown in FIG. 4 employing algorithm 7 assuming the tuning time is 5 and l=13. Twelve ONUs 602 and associated requests $r_i$ 604 are listed along with wavelengths $\lambda_i$ 606 to which the requests are assigned. Available wavelengths w 608 with their respective $a^l_w$ (610) and $a^u_w$ (612) are also shown. Wavelength allocations 614, 616, 618, and 620 display how jobs 2, 3, 4, 8, and 10 still use their last tuned wavelengths after the first step. After the second step, the remaining jobs are successfully scheduled before time point 13 along time axis 648. It should be noted that l cannot be further decreased. The latest job completion time is thus 13.

While embodiments have been discussed above using specific examples, components, scenarios, and configurations in FIG. 1 through FIG. 6, they are intended to provide a general guideline to be used for optimizing network traffic scheduling in tunable laser ONUs of WDM PONs. These examples do not constitute a limitation on the embodiments, which may be implements using other components, maximization schemes, and configurations using the principles described herein. For example, other algorithms may be implemented than those provided as example for scheduling network traffic, number of wavelengths, and the like.

Thus, according to at least some embodiments, dynamic bandwidth allocation (DBA) with any laser tuning time is mapped into a multi-processor scheduling problem, with wavelength channels as machines and requests from ONUs as jobs. The latest ONU request (job) completion time is then minimized to achieve less delay, fairness, and load balancing in practical scenarios with non-zero laser tuning time and preemptive or non-preemptive scheduling.

For preemptive scheduling, request allocation may be accomplished through a combination of four algorithms. The first algorithm may assign wavelengths to requests one by one without ordering. If the remaining time on a wavelength is not enough to satisfy a request, the unscheduled part may be moved to the next wavelength. A second algorithm may add two sorting processes. First process sorts requests in a descending order of their sizes. The second process sorts wavelengths in the ascending order of their available time. First and second algorithms do not take into account a non-zero laser tuning time. A third algorithm may accomplish that by postponing the scheduling of all requests and the last request on each wavelength by the laser tuning time. A fourth algorithm may then fill in idle times in the scheduling and optimize the allocation by dividing the resource allocation process on a wavelength into two steps. The first step is to allocate the time duration between $a^u_w$ and l; the second step is to allocate the time duration between $a^l_w$ and $a^u_w$, where $a^l_w$ is the latest job completion time when a laser is tuned to a current wavelength, $a^u_w$ is the latest job completion time when the laser is to be tuned to any other wavelength, and l is the predefined limit for the latest job completion time. When allocating the resource between $a^u_w$ and l, the largest request may be considered first. To avoid preemption in the middle of the schedule, a request may be scheduled on wavelength w if the remaining available time duration after $a^u_w$ is enough to accommodate the request decreasing the total traffic.

For non-preemptive scheduling, request allocation may be accomplished through a combination of three algorithms. The first algorithm may sort jobs in a descending order of their sizes and machines in the descending order of their channel available time. Then, a search may be performed from the first machine and a job assigned with the first machine on which the job fits. If all the jobs can be scheduled before l, then l is a feasible solution. The second algorithm postpones scheduling of requests by the laser tuning time to factor in non-zero laser tuning times. The third algorithm generates a schedule with a smaller latest job completion time by filling idle time durations on all wavelengths. As a first step the time duration between $a^l_w$ and $a^u_w$ may be allocated to requests when the laser is tuned to the current wavelength giving higher priority to largest jobs since those are not easy to switch wavelengths. Next, jobs for the time duration between $a^u_w$ and l may be allocated following the first algorithm.

Figure 7:
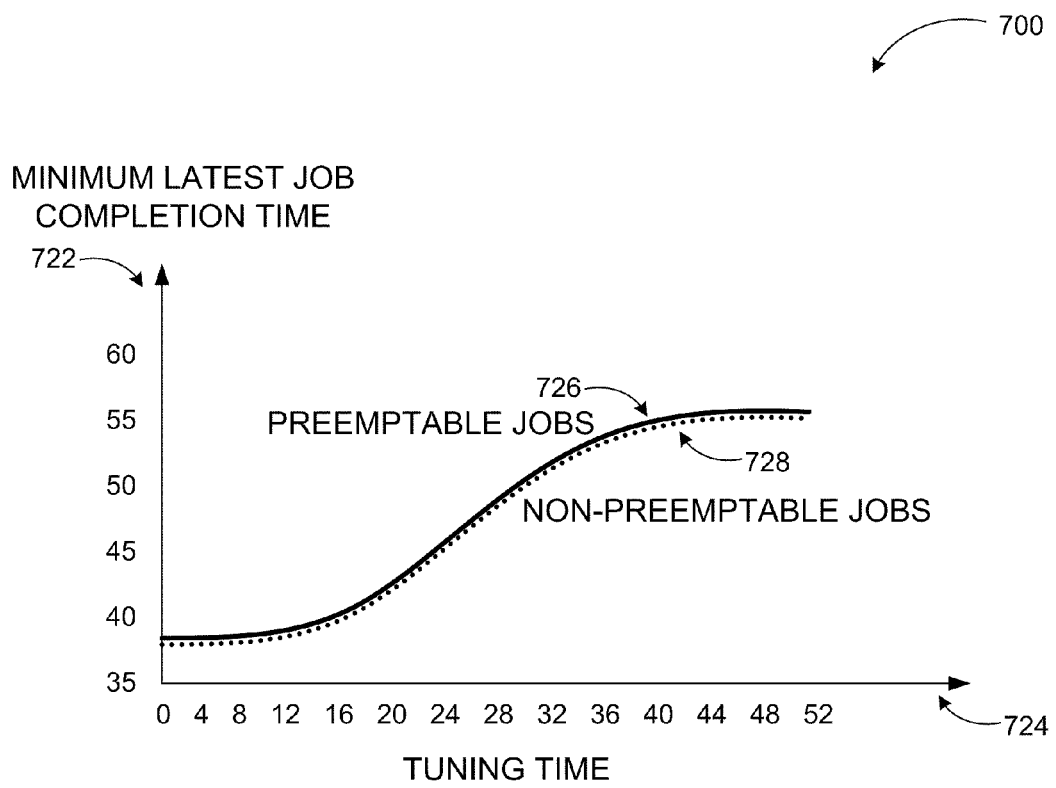
FIG. 7 is a diagram illustrating average latest job completion time for different tuning times of lasers.

FIG. 7 is a diagram illustrating average latest job completion time for different tuning times of lasers. Diagram 700 shows simulation results for an example system according to some embodiments demonstrating that the average latest request completion time 722 increases with the increase of the laser tuning time 724. When the tuning time is less than ~20 for the example system, the corresponding latest request completion time is not far away from the value achieved when τ=0. This implies that lasers with tuning time equaling to 20 can achieve almost equal performance as compared to those with tuning time equaling to 0. However, when the tuning time increases beyond 24, the latest job completion time sharply increases.

In addition, the average latest job completion time achieved when preemption is disallowed (726) is slightly higher than that achieved when preemption is allowed (728) following similar patterns. The difference of average performance is almost negligible. Hence, as compared to the non-preemption case (728), preemption does not introduce a significant average performance improvement.

The simulation results shown in diagram 700 are for illustration purposes and do not constitute a limitation on embodiments. The pattern and values of latest job completion time (performance) of a WDM PON according to embodiments may differ depending on network configuration, number of components, types of lasers used, etc.

Figure 8:
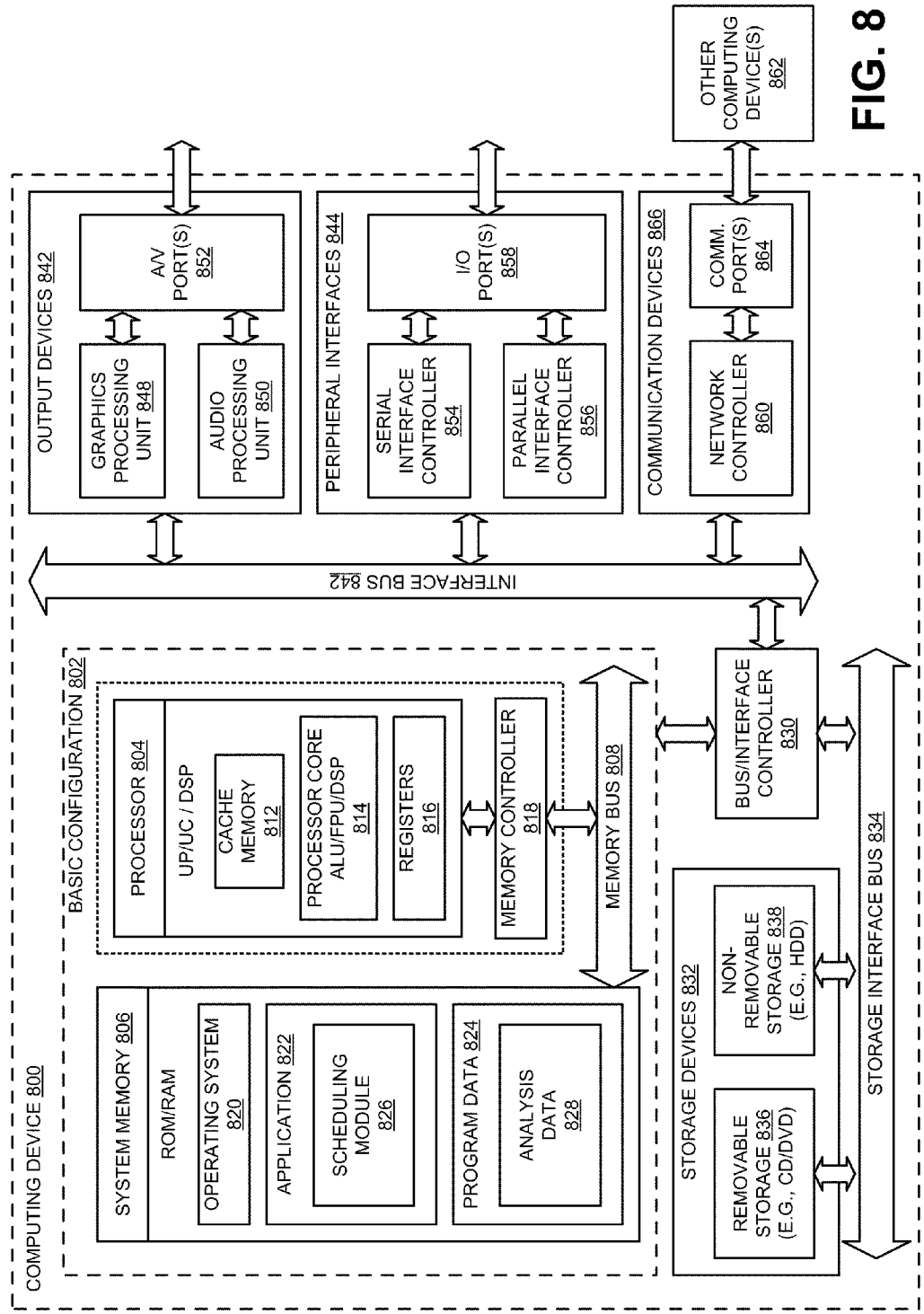
FIG. 8 illustrates a general purpose computing device, which may be used to implement network traffic scheduling on tunable laser ONUs in a WDM PON taking laser tuning times into consideration.

FIG. 8 illustrates an example general purpose computing device 800, which may be used to implement network traffic scheduling on tunable laser ONUs in a WDM PON taking laser tuning times into consideration according to at least some examples of the present disclosure. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof Processor 804 may include one more levels of caching, such as a level cache memory 812, a processor core 814, and registers 816. Example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a scheduling module 826 that is arranged to schedule network traffic for tunable laser ONUs in a WDM PON and any other processes, methods and functions as discussed above. Program data 824 may include one or more of analysis data 828 (e.g. network traffic data, component characteristics, etc.) and similar data as discussed above in conjunction with at least FIG. 2 through 6. This data may be useful for determining optimized network traffic schedule on multiple wavelengths of tunable laser ONUs as is described herein. In some embodiments, application 822 may be arranged to operate with program data 824 on operating system 820 such that ONU traffic is scheduled as described herein. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 866 to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a physical server, virtual server, a computing cloud, or a hybrid device that include any of the above functions. Computing device 800 may also be implemented as a personal computer including both laptop computer and non-laptop computer configurations. Moreover computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 9:
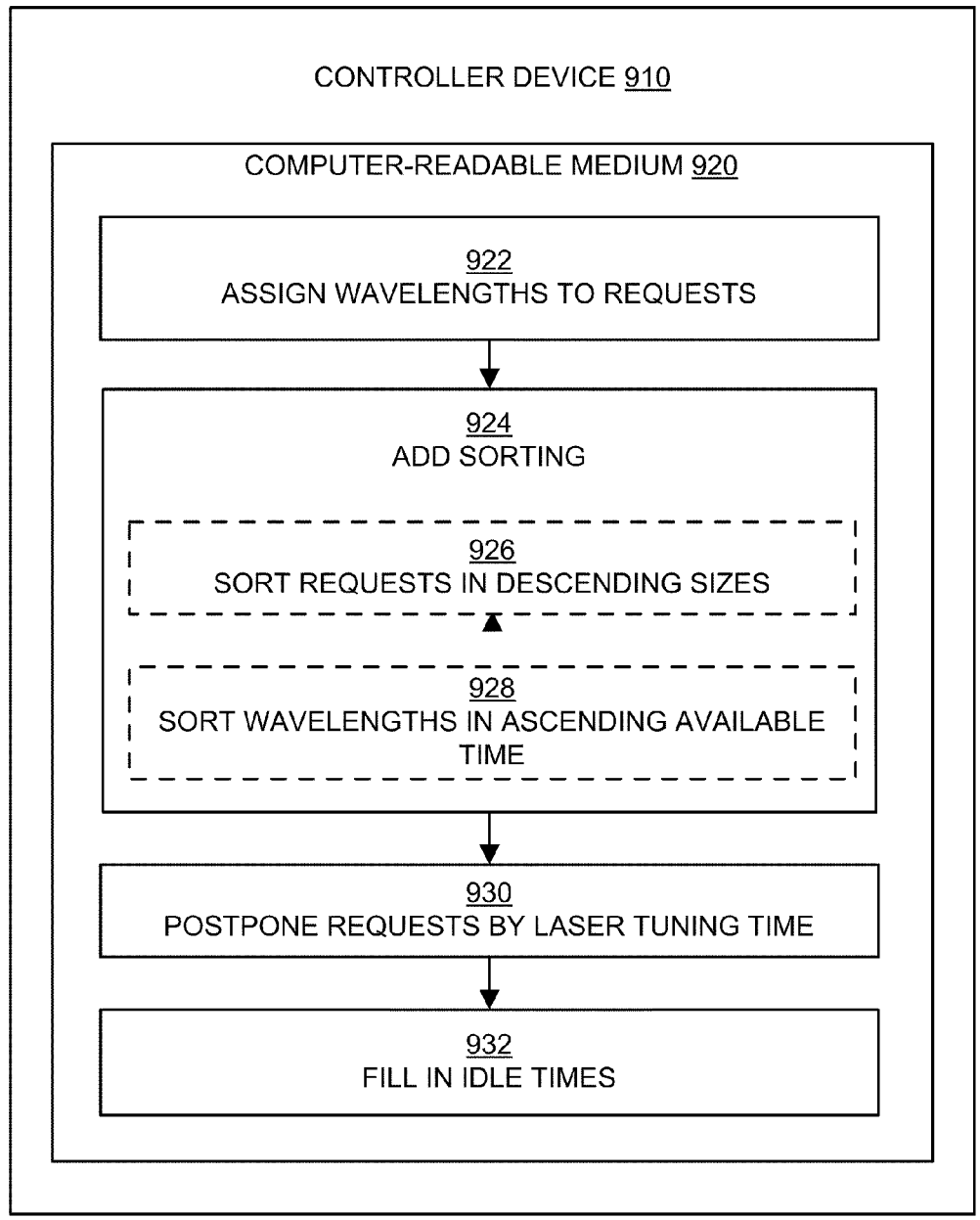
FIG. 9 is a flow diagram illustrating an example method for preemptive scheduling that may be performed by a computing device such as device 800 in FIG. 8.

FIG. 9 is a flow diagram illustrating an example method for preemptive scheduling that may be performed by a computing device such as device 800 in FIG. 8, arranged in accordance with at least some embodiments described herein. The operations described in blocks 922 through 932 may be stored as computer-executable instructions in a computer-readable medium such as computer-readable medium 920 of controller device 910. Controller device 910 may be a special purpose computing device that may execute algorithms for optimizing WDM PON capacity as described above in conjunction with general purpose computing device 800.

A process of optimizing network traffic by allocating requests on multiple wavelengths of ONUs in a WDM PON may include one or more operations, functions or actions as is illustrated by one or more of blocks 922, 924, 926, 928, 930, and/or 932.

Some example processes may begin with operation 922, "ASSIGN WAVELENGTHS TO REQUESTS". At operation 922, wavelengths may be assigned to requests one by one without ordering. If the remaining time on a wavelength is not enough to satisfy a request, the unscheduled part may be moved to the next wavelength. The operation may be performed by a processor of a computing device such as processor 804 of computing device 800.

Operation 922 may be followed by operation 924, "ADD SORTING." At operation 924, the processor (e.g. processor 804) may add two sorting processes executing a second algorithm or within the same algorithm as operation 922. Operation 924 may include at least two sub-operations as illustrated by blocks 926 and/or 928.

At sub-operation 926, "SORT REQUESTS IN DESCENDING SIZES", processor 804 may sort requests in a descending order of their sizes. Sub-operation 926 may be followed by sub-operation 928, "SORT WAVELENGTHS IN ASCENDING AVAILABLE TIME." At sub-operation 928, the processor (e.g. processor 804) may sort wavelengths in the ascending order of their available time. Operations 922 through 928 do not take into account a non-zero laser tuning time as described herein.

Operation 924 may be followed by operation 930, "POSTPONE REQUESTS BY LASER TUNING TIME." At operation 930, the processor (e.g. processor 804) may postpone the scheduling of all requests and the last request on each wavelength by the laser tuning time. Since this may create idle times in the schedule and may increase latest job completion time for the schedule, processing may continue to operation 932 for optimization of the allocation of requests on wavelengths taking laser tuning time into consideration.

Operation 930 may be followed by operation 932, "FILL IN IDLE TIMES." At operation 932, the processor (e.g. processor 804) may optimize the allocation by dividing the resource allocation process on a wavelength into two steps. The first step is to allocate the time duration between $a^u_w$ and l; the second step is to allocate the time duration between $a^l_w$ and $a^u_w$, where $a^l_w$ is the latest job completion time when a laser is tuned to a current wavelength, $a^u_w$ is the latest job completion time when the laser is to be tuned to any other wavelength, and l is the predefined limit for the latest job completion time. The allocation may be implemented on each ONU such as ONUs 106 and 108 of FIG. 1.

Figure 10:
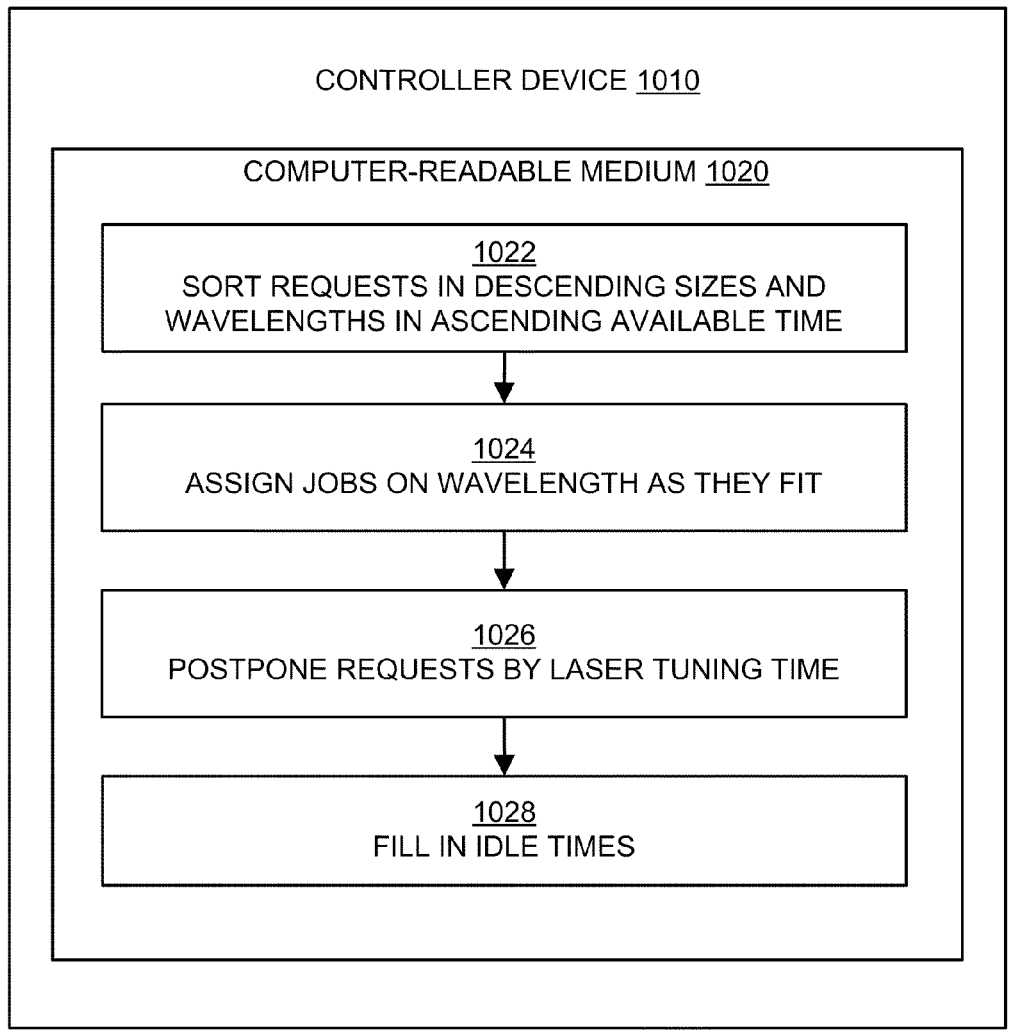
FIG. 10 is a flow diagram illustrating an example method for non-preemptive scheduling that may be performed by a computing device such as device 800 in FIG. 8.

FIG. 10 is a flow diagram illustrating an example method for non-preemptive scheduling that may be performed by a computing device such as device 800 in FIG. 8, arranged in accordance with at least some embodiments described herein.

Some example processes for non-preemptive scheduling may begin with operation 1022, "SORT REQUESTS IN DESCENDING SIZES AND WAVELENGTHS IN ASCENDING AVAILABLE TIME". At operation 1022, requests may be sorted in a descending order of their sizes and wavelengths in the descending order of their channel available time. The operation may be performed by a processor of a computing device such as processor 804 of computing device 800.

Operation 1022 may be followed by operation 1024, "ASSIGN JOBS ON WAVELENGTH AS THEY FIT." At operation 1024, the processor (e.g. processor 804) may perform a search from the first wavelength and a request assigned with the first wavelength on which the request fits. If all the requests can be scheduled before l, then l is a feasible solution.

Operation 1024 may be followed by operation 1026, "POSTPONE REQUESTS BY LASER TUNING TIME." At operation 1026, the processor (e.g. processor 804) may postpone the scheduling of all requests and the last request on each wavelength by the laser tuning time. Since this may create idle times in the schedule and may increase latest job completion time for the schedule, processing may continue to operation 1028 for optimization of the allocation of requests on wavelengths taking laser tuning time into consideration.

Operation 1026 may be followed by operation 1028, "FILL IN IDLE TIMES." At operation 1028, the processor (e.g. processor 804) may generate a schedule with a smaller latest job completion time by filling idle time durations on all wavelengths. First, the time duration between $a^l_w$ and $a^u_w$ may be allocated to requests when the laser is tuned to the current wavelength giving higher priority to largest jobs since those are not easy to switch wavelengths. Next, jobs for the time duration between $a^u_w$ and l may be allocated following the first algorithm. The allocations may be implemented on each ONU such as ONUs 106 and 108 of FIG. 1.

The operations included in the processes of FIG. 9 and FIG. 10 described above are for illustration purposes. Optimized scheduling of network traffic on tunable laser ONUs of WDM PONs may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 11:
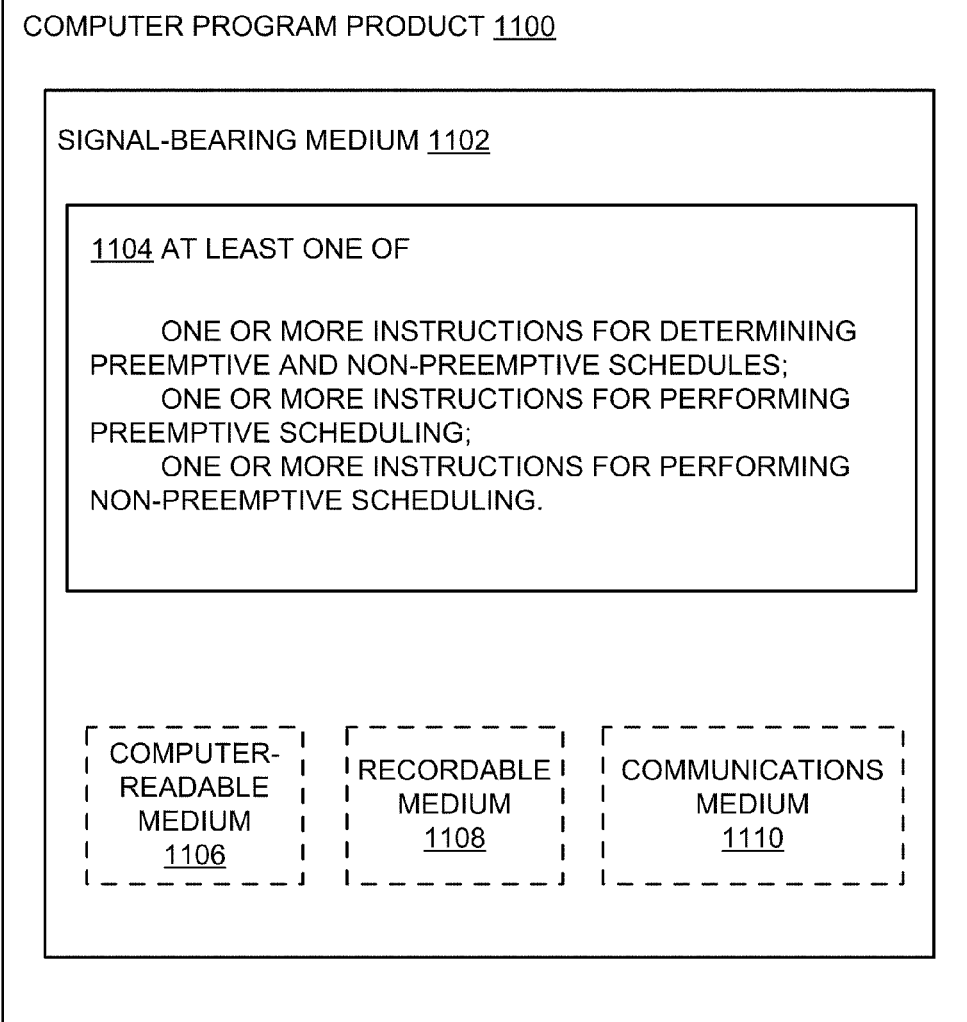
FIG. 11 illustrates a block diagram of an example computer program product, all arranged in accordance with at least some embodiments described herein.

FIG. 11 illustrates a block diagram of an example computer program product 1100 arranged in accordance with at least some embodiments described herein. In some examples, as shown in FIG. 11, computer program product 1100 may include a signal bearing medium 1102 that may also include machine readable instructions 1104 that, when executed by, for example, a processor, may provide the functionality described above with respect to FIG. 2 through FIG. 6. Thus, for example, referring to processor 1104, one or more of the tasks shown in FIG. 11 may be undertaken in response to instructions 1104 conveyed to the processor 1104 by medium 1102 to perform actions associated with scheduling network traffic on tunable laser ONUs of a WDM PON as described herein. Some of those instructions may include determining preemptive and non-preemptive schedules, performing preemptive scheduling, and non-preemptive scheduling through one or more algorithms as described previously.

In some implementations, signal bearing medium 1102 depicted in FIG. 11 may encompass a computer-readable medium 1106, such as, but not limited to, a hard disk drive, a Compact Disc (CD), a Digital Versatile Disk (DVD), a digital tape, memory, etc. In some implementations, signal bearing medium 1102 may encompass a recordable medium 1108, such as, but not limited to, memory, read/write (R/W) CDs, R/W DVDs, etc. In some implementations, signal bearing medium 1102 may encompass a communications medium 1110, such as, but not limited to, a digital and/or an analog communication medium (e.g., a fiber optic cable, a waveguide, a wired communications link, a wireless communication link, etc.). Thus, for example, computer program product 1100 may be conveyed to the processor 1104 by an RF signal bearing medium 1102, where the signal bearing medium 1102 is conveyed by a wireless communications medium 1110 (e.g., a wireless communications medium conforming with the IEEE 802.11 standard).

In some examples, the present disclosure describes a method for allocating network traffic requests on multiple wavelength optical network units (ONUs) of a wavelength division multiplexing (WDM) passive optical network (PON). The method may include determining whether an allocation is for a preemptive schedule or a non-preemptive schedule. For the preemptive schedule, the method may further include assigning wavelengths to requests, sorting the requests and the wavelengths, postponing the requests by a laser tuning time associated with each ONU, and optimizing the preemptive schedule by filling in idle times.

In other examples, the method for preemptive scheduling may also include moving an unscheduled part of the request to a next wavelength when a remaining time on a wavelength assigned with requests is insufficient to satisfy a request and postponing the requests may include postponing scheduling of all requests and a last request on each wavelength by the laser tuning time associated with an ONU currently being allocated.

In further examples, the method for preemptive scheduling may include sorting the requests in descending order of a size of each request and sorting the wavelengths in ascending order of an available time for each wavelength. Filling in the idle times may include allocating a time duration between $a^u_w$ and l first and allocating a time duration between $a^l_w$ and $a^u_w$ second, where $a^l_w$ is a latest job completion time when the laser is tuned to the current wavelength, $a^u_w$ is a latest job completion time when a laser is to be tuned to a wavelength other than a current one, and l is a predefined limit for the latest job completion time. The requests may be prioritized by size when allocating the requests to the wavelengths between $a^u_w$ and l. Furthermore, a request may be scheduled on a wavelength when a remaining available time duration after $a^u_w$ is sufficient to accommodate the request.

In yet other examples, the method for non-preemptive scheduling may include sorting the requests in descending order of a size of each request and the wavelengths in ascending order of an available time for each wavelength, performing a search in order of wavelengths starting from a first wavelength, and assigning each request to the wavelengths to which the request temporally fits.

The allocation may be determined to be feasible when all requests are scheduled before a predefined limit for latest job completion time. The latest job completion time may be reduced for non-preemptive scheduling by allocating time duration between $a^l_w$ and $a^u_w$ to requests when a laser is tuned to a current wavelength, where $a^l_w$ is a latest job completion time when the laser is tuned to the current wavelength and $a^u_w$ is a latest job completion time when the laser is to be tuned to a wavelength other than the current wavelength.

In case of non-preemptive scheduling, requests may be prioritized based on a descending order of a size of each request. The method for non-preemptive scheduling may further include allocating remaining requests for a time duration between $a^u_w$ and l based on descending order of a size of each request and an ascending order of an available time for each wavelength, where l is a predefined limit for the latest job completion time.

In some examples, the present disclosure describes an apparatus for allocating network traffic requests on multiple wavelength optical network units (ONUs) of a wavelength division multiplexing (WDM) passive optical network (PON). The apparatus may include a memory configured to store instructions and also store network information data associated with the WDM PON and a processor coupled to the memory, wherein the processor is adapted to execute the instructions.

When the instructions are executed, the processor may determine whether an allocation is for a preemptive schedule or a non-preemptive schedule. For the preemptive schedule, the processor may assign wavelengths to requests, sort the requests in descending order of a size of each request and the wavelengths in ascending order of an available time for each wavelength. For the non-preemptive schedule, the processor may sort the requests in descending order of a size of each request and the wavelengths in ascending order of an available time for each wavelength, and assign each request to the wavelengths to which the request temporally fits. In both cases, the processor may postpone the requests by a laser tuning time associated with each ONU and optimize the schedules by filling in idle times.

According to further examples, the processor may fill in the idle times in the preemptive schedule based on allocation of a time duration between $a^u_w$ and l first and allocation of a time duration between $a^l_w$ and $a^u_w$ second, where $a^l_w$ is a latest job completion time when a laser is tuned to a current wavelength, $a^u_w$ is the latest job completion time when the laser is to be tuned to a wavelength other than the current one, and l is a predefined limit for the latest job completion time. In the non-preemptive schedule, the processor may fill in the idle times based on allocation of a time duration between $a^l_w$ and $a^u_w$ to requests when a laser is tuned to a current wavelength and allocation of remaining requests for a time duration between $a^u_w$ and l based on descending order of a size of each request and an ascending order of an available time for each wavelength.

The ONUs of the WDM PON may include wavelength-tunable sources and/or multi-wavelength sources. The ONUs may also include a full-range laser source and/or a limited-range laser source. The laser source may include one or more of a multi-frequency laser, a distributed feedback (DFB) laser diode (LD) array, a gain-coupled DFB array, a chirped-pulse WDM, a distributed Bragg reflector (DBR) array, a sampled grating DBR, or an external cavity laser etalon.

In yet further examples, the present disclosure describes a computer-readable storage medium having instructions stored thereon for allocating network traffic requests on multiple wavelength optical network units (ONUs) of a wavelength division multiplexing (WDM) passive optical network (PON). The instructions may include determining whether an allocation is for a preemptive schedule or a non-preemptive schedule, assigning wavelengths to requests and sorting the requests in descending order of a size of each request and the wavelengths in ascending order of an available time for each wavelength in case of preemptive scheduling, and sorting the requests in descending order of a size of each request and the wavelengths in ascending order of an available time for each wavelength and assigning each request to the wavelengths to which the request temporally fits in case of non-preemptive scheduling.

The instructions may also include in both cases of scheduling postponing all requests and a last request on each wavelength by the laser tuning time associated with an ONU currently being allocated and reducing an overall latest job completion time for the preemptive schedule by allocating a time duration between $a^u_w$ and 1 first and allocating a time duration between $a^l_w$ and $a^u_w$ second, where $a^l_w$ is a latest job completion time when a laser is tuned to a current wavelength, $a^u_w$ is the latest job completion time when the laser is to be tuned to a wavelength other than the current one, and l is a predefined limit for the latest job completion time. For non-preemptive scheduling, the instructions may include reducing an overall latest job completion time by allocating a time duration between $a^l_w$ and $a^u_w$ to requests when a laser is tuned to a current wavelength and allocating remaining requests for a time duration between $a^u_w$ and 1 based on descending order of a size of each request and an ascending order of an available time for each wavelength.

In case of preemptive schedule, the instructions may include prioritizing requests by size when allocating the requests to the wavelengths between $a^u_w$ and 1. In case of non-preemptive schedule, the instructions may include prioritizing requests based on a descending order of a size of each request for all wavelengths. According to some examples, a request may be scheduled on a wavelength if a remaining available time duration after $a^u_w$ is sufficient to accommodate the request. While embodiments are generally discussed in context of WDM PONs, they are not limited to WDM PON applications. Some embodiments may also be implemented for any multiprocessor scheduling computation, where jobs take non-negligible time to switch machines. Such embodiments may be implemented in various fields like industrial engineering and telecommunications.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for allocating network traffic requests on multiple wavelength optical network units (ONUs) of a wavelength division multiplexing (WDM) passive optical network (PON), the method comprising:
    determining whether an allocation is for a preemptive schedule or a non-preemptive schedule;
    for the preemptive schedule, assigning wavelengths to requests;
    sorting the requests and the wavelengths;
    postponing the requests by a laser tuning time associated with each ONU;
    optimizing the preemptive schedule by filling in idle times; and
    moving an unscheduled part of one of the requests to a next wavelength when a remaining time on one of the wavelengths assigned with the request is insufficient to satisfy the request.

2. The method according to claim 1, further comprising one or more of:
    sorting the requests in descending order of a size of each request; and
    sorting the wavelengths in ascending order of an available time for each wavelength.

3. The method according to claim 1, wherein postponing the requests comprises postponing scheduling of all requests and a last request on each wavelength by the laser tuning time associated with an ONU currently being allocated.

4. The method according to claim 1, wherein filling in the idle times comprises allocating a time duration between $a^u_w$ and l, where $a^u_w$ is a latest job completion time when a laser is to be tuned to a wavelength other than a current one and l is a predefined limit for the latest job completion time.

5. The method according to claim 4, wherein filling in the idle times further comprises allocating a time duration between $a^l_w$ and $a^u_w$, where $a^l_w$ is a latest job completion time when the laser is tuned to the current wavelength.

6. The method according to claim 4, further comprising prioritizing requests by size when allocating the requests to the wavelengths between $a^u_w$ and l.

7. The method according to claim 4, wherein filling in the idle times further comprises scheduling a request on a wavelength when a remaining available time duration after $a^u_w$ is sufficient to accommodate the request.

8. The method according to claim 1, further comprising one or more of:
for the non-preemptive schedule, sorting the requests in descending order of a size of each request and the wavelengths in ascending order of an available time for each wavelength;
performing a search in order of wavelengths starting from a first wavelength; and
assigning each request to the wavelengths to which the request temporally fits.

9. The method according to claim 8, further comprising determining the allocation to be feasible when all requests are scheduled before a predefined limit for latest job completion time.

10. The method according to claim 9, further comprising reducing the latest job completion time by allocating time duration between $a^l_w$ and $a^u_w$ to requests when a laser is tuned to a current wavelength, where $a^l_w$ is a latest job completion time when the laser is tuned to the current wavelength and $a^u_w$ is a latest job completion time when the laser is to be tuned to a wavelength other than the current wavelength.

11. The method according to claim 10, further comprising prioritizing requests based on a descending order of a size of each request.

12. The method according to claim 10, further comprising allocating remaining requests for a time duration between $a^u_w$ and l based on descending order of a size of each request and an ascending order of an available time for each wavelength, where l is a predefined limit for the latest job completion time.

13. An apparatus for allocating network traffic requests on multiple wavelength optical network units (ONUs) of a wavelength division multiplexing (WDM) passive optical network (PON), comprising:
a memory configured to store instructions and also store network information data associated with the WDM PON;
a processor coupled to the memory, wherein the processor is adapted to execute the instructions, which when executed configure the processor to:
determine whether an allocation is for a preemptive schedule or a non-preemptive schedule;
for the preemptive schedule:
assign wavelengths to requests;
sort the requests in descending order of a size of each request and the wavelengths in ascending order of an available time for each wavelength;
for the non-preemptive schedule:
sort the requests in descending order of a size of each request and the wavelengths in ascending order of an available time for each wavelength;
assign each request to the wavelengths to which the request temporally fits;
postpone the requests by a laser tuning time associated with each ONU; and
optimize the schedules by filling in idle times.

14. The apparatus according to claim 13, wherein the processor is further configured to fill in the idle times in the preemptive schedule based on allocation of a time duration between $a^u_w$ and l first and allocation of a time duration between $a^l_w$ and $a^u_w$ second, where $a^l_w$ is a latest job completion time when a laser is tuned to a current wavelength, $a^u_w$ is the latest job completion time when the laser is to be tuned to a wavelength other than the current one, and l is a predefined limit for the latest job completion time.

15. The apparatus according to claim 13, wherein the processor is further configured to fill in the idle times in the non-preemptive schedule based on allocation of a time duration between $a^l_w$ and $a^u_w$ to requests when a laser is tuned to a current wavelength and allocation of remaining requests for a time duration between $a^u_w$ and l based on descending order of a size of each request and an ascending order of an available time for each wavelength, where $a^l_w$ is a latest job completion time when a laser is tuned to a current wavelength, $a^u_w$ is the latest job completion time when the laser is to be tuned to a wavelength other than the current one, and l is a predefined limit for the latest job completion time.

16. The apparatus according to claim 13, wherein the ONUs of the WDM PON include at least one of wavelength-tunable sources and/or multi-wavelength sources.

17. The apparatus according to claim 13, wherein the ONUs include at least one of a full-range laser source and a limited-range laser source.

18. The apparatus according to claim 17, wherein the laser source includes one or more of a multi-frequency laser, a distributed feedback (DFB) laser diode (LD) array, a gain-coupled DFB array, a chirped-pulse WDM, a distributed Bragg reflector (DBR) array, a sampled grating DBR, or an external cavity laser etalon.

19. A computing device comprising:
a memory configured to store instructions for allocating network traffic requests on multiple wavelength optical network units (ONUs) of a wavelength division multiplexing (WDM) passive optical network (PON),
a processor coupled to the memory, wherein the processor is adapted to execute the instructions, which when executed configure the processor to:
determine whether an allocation is for a preemptive schedule or a non-preemptive schedule;
for the preemptive schedule:
assign wavelengths to requests;
sort the requests in descending order of a size of each request and the wavelengths in ascending order of an available time for each wavelength;
for the non-preemptive schedule:
sort the requests in descending order of a size of each request and the wavelengths in ascending order of an available time for each wavelength;
sort each request to the wavelengths to which the request temporally fits;
postpone all requests and a last request on each wavelength by the laser tuning time associated with an ONU currently being allocated; and
reduce an overall latest job completion time.

20. The device according to claim 19, wherein the processor is further configured to:
- reduce an overall latest job completion time for the preemptive schedule by an action to:
  - allocate a time duration between $a^u_w$ and l first and allocating a time duration between $a^l_w$ and $a^u_w$ second, where $a^l_w$ is a latest job completion time when a laser is tuned to a current wavelength, $a^u_w$ is the latest job completion time when the laser is to be tuned to a wavelength other than the current one, and t is a predefined limit for the latest job completion time; and
- reduce an overall latest job completion time for the non-preemptive schedule by an action to:
  - allocate a time duration between $a^l_w$ and $a^u_w$ to requests when a laser is tuned to a current wavelength and allocating remaining requests for a time duration between $a^u_w$ and l based on descending order of a size of each request and an ascending order of an available time for each wavelength.

21. The device according to claim 20, wherein the processor is further configured to:
- for the preemptive schedule:
  - prioritize requests by size when allocating the requests to the wavelengths between $a^u_w$ and l; and
- for the non-preemptive schedule:
  - prioritize requests based on a descending order of a size of each request for all wavelengths.

22. The device according to claim 19, wherein the processor is further configured to:
- schedule a request on a wavelength if a remaining available time duration after $a^u_w$ is sufficient to accommodate the request.

* * * * *